US008958295B2

(12) United States Patent
Sullivan et al.

(10) Patent No.: US 8,958,295 B2
(45) Date of Patent: *Feb. 17, 2015

(54) ADAPTIVE EDGE-IMPLEMENTED TRAFFIC POLICY IN A DATA PROCESSING NETWORK

(75) Inventors: Marc Sullivan, Austin, TX (US); Steven Belz, Cedar Park, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/618,877

(22) Filed: Sep. 14, 2012

(65) Prior Publication Data

US 2013/0010594 A1    Jan. 10, 2013

Related U.S. Application Data

(63) Continuation of application No. 12/013,995, filed on Jan. 14, 2008, now Pat. No. 8,284,780.

(51) Int. Cl.
*H04L 12/26* (2006.01)
*H04L 12/801* (2013.01)
*H04L 12/813* (2013.01)
*H04L 12/851* (2013.01)
*H04L 12/841* (2013.01)
*H04L 12/823* (2013.01)

(52) U.S. Cl.
CPC ............... *H04L 47/10* (2013.01); *H04L 47/20* (2013.01); *H04L 47/2441* (2013.01); *H04L 47/28* (2013.01); *H04L 47/32* (2013.01)

USPC .......................................................... 370/231

(58) Field of Classification Search
CPC ......... H04L 12/02; H04L 12/28; H04L 12/54; H04L 12/2854; H04L 12/2856; H04L 47/6215
USPC ......... 370/395.2–395.43, 229–235, 250–253, 370/400–407, 412–419, 455, 463
See application file for complete search history.

(56) References Cited

U.S. PATENT DOCUMENTS

| | | | |
|---|---|---|---|
| 7,023,825 B1 * | 4/2006 | Haumont et al. | 370/338 |
| 7,099,275 B2 | 8/2006 | Sarkinen et al. | |
| 7,120,113 B1 | 10/2006 | Zhang et al. | |
| 7,123,587 B1 | 10/2006 | Hass et al. | |
| 2002/0080786 A1 * | 6/2002 | Roberts | 370/389 |

(Continued)

*Primary Examiner* — Thai Hoang
(74) *Attorney, Agent, or Firm* — Scott P. Zimmerman, PLLC

(57) ABSTRACT

In one aspect, a disclosed method of processing a network packet received by an edge device from a client in a data processing network includes determining a priority category of the network packet when the priority category is indicative of a priority associated with the packet. The method further includes determining a value of a traffic state parameter. The traffic state parameter indicates a level of traffic activity in a backbone network to which the edge device is connected. A traffic policy is then determined that is applicable to the level of traffic activity and the priority category of the network packet. The network packet is then blocked from traversing or permitted to traverse the network packet edge device based on the determined traffic policy. Determining the priority category may include determining a transport protocol port number of the network packet.

16 Claims, 5 Drawing Sheets

(56) References Cited

U.S. PATENT DOCUMENTS

| | | |
|---|---|---|
| 2003/0099200 A1 | 5/2003 | Kiremidjian et al. |
| 2003/0121047 A1 | 6/2003 | Watson et al. |
| 2005/0152365 A1* | 7/2005 | Yazaki et al. ............ 370/389 |
| 2005/0180426 A1* | 8/2005 | Sakata et al. ............ 370/395.2 |
| 2006/0050636 A1 | 3/2006 | Menth |
| 2006/0153204 A1 | 7/2006 | Wang et al. |
| 2006/0171397 A1 | 8/2006 | Watkinson |
| 2008/0298391 A1 | 12/2008 | Feroz et al. |

* cited by examiner

| PORT | IMPORTANCE | TRAFFIC (LOW) | TRAFFIC (MEDIUM) | TRAFFIC (HIGH) | TRAFFIC (VERY HIGH) |
|---|---|---|---|---|---|
| 1-79 | 1 | OPEN | OPEN | OPEN | OPEN |
| 80,81 (http) | 3 | OPEN | OPEN | CLOSED | CLOSED |
| 82-118 | 1 | OPEN | OPEN | OPEN | OPEN |
| 119 (nntp) | 4 | OPEN | CLOSED | CLOSED | CLOSED |
| 120-427 | 1 | OPEN | OPEN | OPEN | OPEN |
| 443 (https) | 2 | OPEN | OPEN | OPEN | CLOSED |
| PORTS FOR ONLINE GAMES | 4 | OPEN | CLOSED | CLOSED | CLOSED |

| PORT | IMPORTANCE DAY/NIGHT | TRAFFIC (LOW) | TRAFFIC (MEDIUM) | TRAFFIC (HIGH) | TRAFFIC (VERY HIGH) |
|---|---|---|---|---|---|
| 1-79 | 1/1 | OPEN | OPEN | OPEN | OPEN |
| 80,81 (http) | 3/3 | OPEN | OPEN | CLOSED | CLOSED |
| 82-118 | 1/2 | OPEN | OPEN | OPEN | OPEN/CLOSED |
| 119 (nntp) | 4/3 | OPEN | CLOSED/OPEN | CLOSED | CLOSED |
| 120-427 | 1/1 | OPEN | OPEN | OPEN | OPEN |
| 443 (https) | 2/3 | OPEN | OPEN | OPEN/CLOSED | CLOSED |
| PORTS FOR ONLINE GAMES | 4/2 | OPEN | CLOSED/OPEN | CLOSED/OPEN | CLOSED |

ADAPTIVE EDGE-IMPLEMENTED TRAFFIC POLICY IN A DATA PROCESSING NETWORK

CROSS-REFERENCE TO RELATED APPLICATIONS

The present patent application is a continuation of U.S. application Ser. No. 12/013,995, filed Jan. 14, 2008 and now issued as U.S. Pat. No. 8,284,780, the entirety of which is hereby incorporated by reference.

BACKGROUND

1. Field of the Disclosure

The present disclosure relates to data processing networks and, more particularly, traffic management in data processing networks.

2. Description of the Related Art

Methods of controlling the accessibility of a network during periods of sustained traffic are generally based on indiscriminate rate limiting. This type of control may not result in substantially reduced traffic in a Transport Control Protocol/Internet Protocol (TCP/IP) environment. For example, because TCP includes retransmission of lost packets, packet traffic may remain relatively unaffected when a conventional rate limit is imposed.

DESCRIPTION OF THE EMBODIMENT(S)

Figure 1:
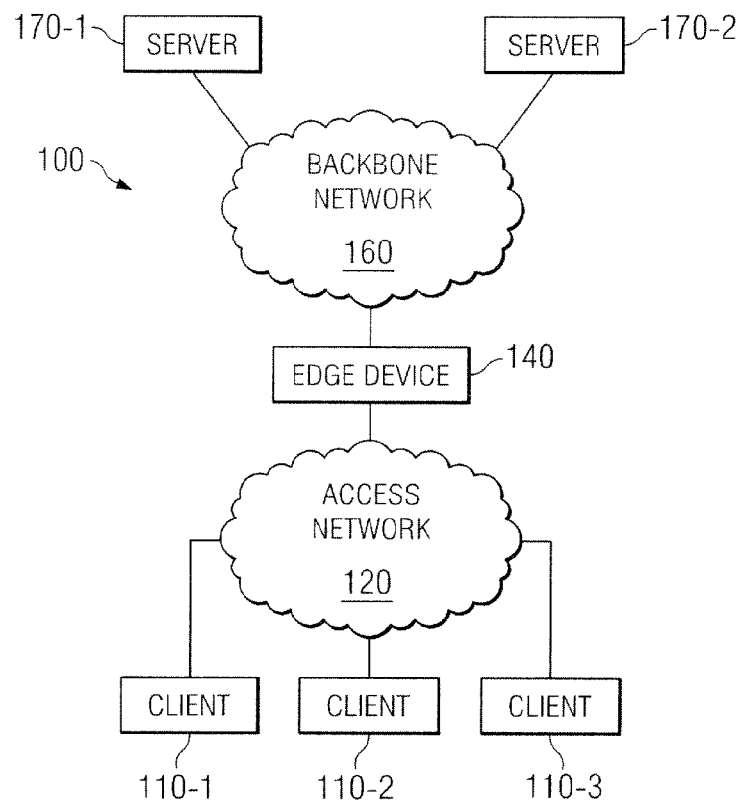
FIG. 1 is a block diagram of selected elements of an embodiment of a data processing network.

In one aspect, a disclosed method of processing a network packet received by an edge device from a client in a data processing network includes determining a priority category of the network packet when the priority category is indicative of a priority associated with the packet. The method further includes determining a value of a traffic state parameter. The traffic state parameter indicates a level of traffic activity in a backbone network to which the edge device is connected. A traffic policy is then determined that is applicable to the level of traffic activity and the priority category of the network packet. The network packet is then blocked from traversing or permitted to traverse the network packet edge device based on the determined traffic policy. Determining the priority category may include determining a port number of a transport protocol header of the network packet. Determining the value of the traffic state parameter may include periodically receiving a value of the traffic state parameter from a provider server. Determining the traffic policy comprises looking up the traffic policy in a traffic policy table based on the priority category and the value of the traffic state parameter. Determining the traffic policy may include selecting the determined traffic policy from multiple traffic policies where selecting the traffic policy includes selecting the traffic policy based on an environmental factor. The multiple traffic policies may be associated with respective time of day values. In such embodiments, selecting includes selecting from the multiple traffic policies based at least in part on a time of day value.

In another aspect, a computer program product comprising computer executable instructions, stored on a tangible computer readable medium, for filtering traffic in a data processing network, includes instructions to detect receipt of a packet from a client and approximate a priority of the packet based on information in a transport protocol header of the packet. The computer program product further includes instructions to determine whether to process the packet based at least in part on the priority. The instructions to approximate may comprise instructions to approximate based on a port number in a transport protocol header of the packet. The transport protocol header may be compliant with any of various transport protocols including, as examples, the transport control protocol (TCP), the user datagram protocol (UDP), the datagram congestion control protocol (DCCP), and the stream control transmission protocol (SCTP). The instructions to detect receipt of the packet may include instructions to detect receipt from the client by an edge device. The instructions to determine whether to process may include instructions to determine whether to permit the packet to traverse the edge device and thereby reach a backbone network. The instructions to determine whether to process include instructions to determine whether to process based at least in part on the priority and upon a value of a traffic state parameter indicative of traffic activity on the backbone network. The instructions to determine may further include instructions to determine based, in addition, on an environmental factor selected from time of day, day of the week, and day of the year.

In another aspect, an edge device for use in a data processing network includes a backbone interface to communicate with a provider server via a backbone network, an access interface to communicate with a client via an access network, a processor in communication with the backbone interface and the access interface; and a storage resource accessible to the processor and containing a traffic filter application to block selected packets received from the client from reaching the backbone network based on a port number associated with the packet. The traffic filter application may block the selected packets based on the port number and a level of traffic activity of the backbone network. The traffic filter application may determine the level of traffic activity based on a value of a most recently received traffic state parameter. The traffic filter application may block select packets by accessing a traffic policy table and determining a traffic policy from the traffic policy table based at least in part on a TCP port number. Determining the traffic policy may further include determining based, at least in part, on the time of day, day of week and day of year. The traffic policy table may reside in the storage resource of the edge device.

In another aspect, a disclosed provider server in a data processing network includes a processor, a network interface card accessible to the processor, and a storage resource accessible to the processor. The storage resource further includes instructions, executable by the processor, to monitor packet traffic in the network, determine, at fixed or variable intervals, a value for a traffic state parameter based on the monitored packet traffic, and transmit the traffic state parameter to an edge device. Transmitting the traffic state parameter may include multicasting the traffic state parameter to a plurality of edge devices. The traffic state parameter may be selected from a small set of traffic state parameter values such as low, medium, high, and very high.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 illustrates selected elements of an embodiment of a data processing network 100. In the depicted embodiment, data processing network 100 includes clients 110 that communicate with an edge device 140 via an access network 120. The edge device 140 is so named because it resides architecturally at the boundary or edge of access network 120 and a provider network, also referred to herein as a backbone network 160. Provider servers 170 communicate with each other and with edge device 140 via backbone network 160. Many clients 110 may communicate with a single edge device 140.

The access network 120 includes the physical layer of a network that connects to a subscriber's household. The access network 120 may include twisted copper, fiber optic, coaxial, and/or various other types of cables. The backbone network 160 may be implemented as a high speed network entirely or primarily comprised with high bandwidth fiber channel cables. Edge device 140 may be implemented as a general purpose data processor, a dedicated internet appliance, or some combination thereof. Edge device 140 may include functionality, for example, to respond to requests from client 110 and forward requests to provider servers 170. In some embodiments, data processing network 100 is an IP based network suitable for transmitting a variety of types of data including email, web pages, Voice over Internet Protocol (VoIP) telephony calls, and so forth.

In the following discussion, some aspects of the disclosed networks, systems, devices, and methods may be implemented as computer program products. A computer program product is a sequence or set of computer executable instructions stored on a tangible computer readable medium. The instructions that make up a computer program product may be referred to herein as software or code.

Figure 2:
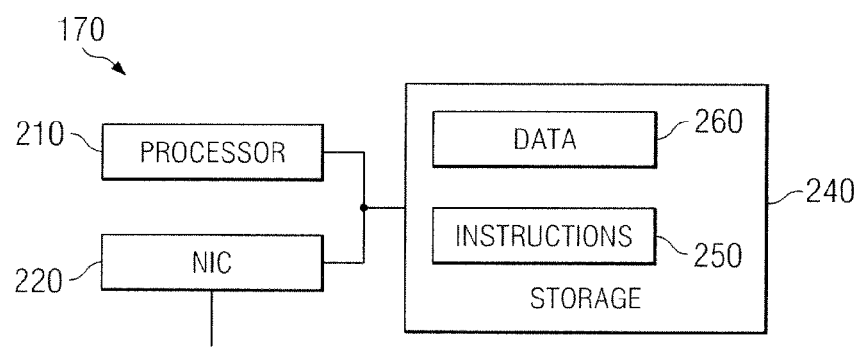
FIG. 2 is a block diagram of selected elements of an embodiment of a provider server in the network of FIG. 1.
Figure 3:
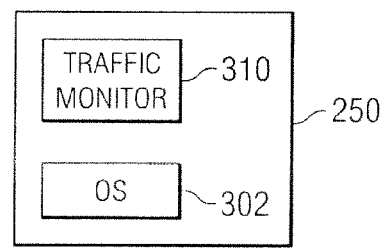
FIG. 3 is a block diagram of selected computer program product elements of an embodiment of the provider server of FIG. 2.

Turning now to FIG. 2 and FIG. 3, selected hardware and software elements of an embodiment of provider server 170 as depicted in FIG. 1 are presented. As depicted in FIG. 2, provider server 170 may be implemented as a general purpose microprocessor-based data processing device. In these embodiments, provider server 170 as depicted in FIG. 2 includes a general purpose processor 210, a storage resource 240, and a network adapter, also referred to as a Network Interface Card (NIC) 220. Storage resource 240 and NIC 220 are accessible to processor 210. NIC 220 facilitates communication between processor 210 and backbone network 160. NIC 220 may include integrated support for one or more network protocol stacks including, as examples, TCP/IP, and User Datagram Protocol/IP, also known as UDP/IP.

Storage resource 240 includes a tangible computer readable medium in or on which instructions 250 and data 260 may be stored. Storage resource 240 may include volatile storage elements including dynamic or static Random Access Memory (RAM) elements suitable for storing instructions during execution and persistent or nonvolatile storage elements including, as examples, magnetic disks, flash memory devices, optical media including CDs and DVDs and so forth.

FIG. 3 is a block diagram of selected computer program product elements in one embodiment of the computer executable instructions 250 stored in storage resource 240. In the depicted embodiment, the instructions 250 of server 170 include an operating system 302 and a traffic monitoring application 310. Operating system 302 provides file management, scheduling resources, and may encompass firmware operable to provide low level interfaces. Operating system 302 may include elements of any number of pervasive operating systems including Unix based systems such as Linux, Redhat, and the like and Windows systems from Microsoft.

In one embodiment, traffic monitor application 310 is operable to execute within backbone network 160 and determine information about network packet traffic in backbone network 160. The packet traffic monitored by backbone network 160 may include packets to and from provider server 170 and/or packets to and from other servers and other elements of backbone network 160. In addition, traffic monitor application 310 may include functionality to determine a value of a traffic state parameter indicative of a state of packet traffic in backbone network 160. In these embodiments, provider server 170 may include rules for determining the state of packet traffic. The traffic monitor application 310 may be further operable to transmit a traffic state parameter message periodically, at fixed or variable intervals, to edge device 140 to convey the state of packet traffic in backbone network 160.

Provider server 170 may include additional applications (not shown) to support its intended function. For example, in embodiments where provider server 170 is implemented as a web server, email server, or database server, provider server 170 may include a web server application, an email application, or a database application as appropriate. In some embodiments, for example, provider server 170 may determine itself to be operating in one or four messaging activity states, qualitatively referred to as low, medium, high, and very high. In some embodiments, traffic monitor 310 may include functionality to transmit messages indicating the traffic activity state to edge device 140. The activity state message may be sent periodically at fixed or variable intervals. The edge device 140 may respond to receiving a messaging activity message indicative of messaging activity by implementing a policy that affects how much traffic edge device 140 permits to ingress backbone network 160 from access network 120 as described further below.

Figure 4:
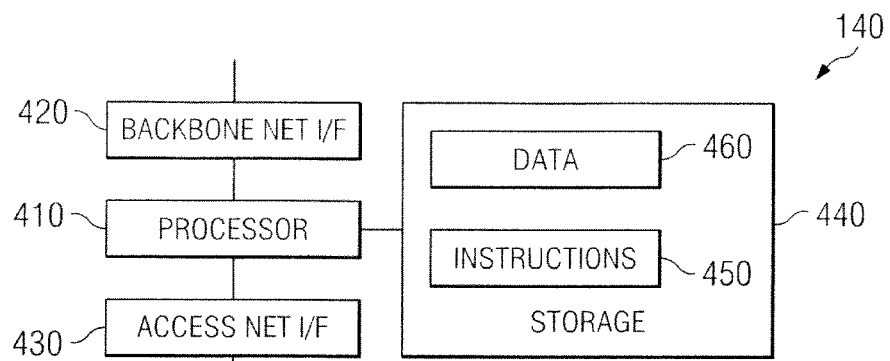
FIG. 4 is a block diagram of selected elements of an embodiment of an edge device in the network of FIG. 1.
Figure 5:
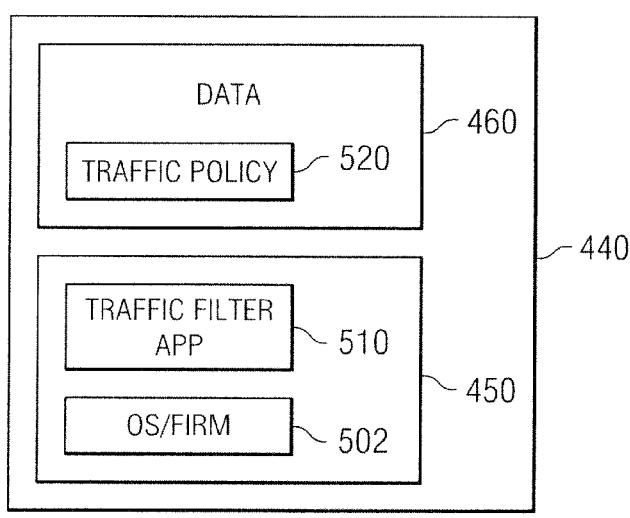
FIG. 5 is a block diagram of selected computer program product elements of an embodiment of the edge device of FIG. 4.

Referring now to FIG. 4 and FIG. 5, selected hardware and software elements of an embodiment of edge device 140 are depicted. In the depicted embodiment, edge device 140 includes a general purpose processor 410 having access to a backbone network interface 420, an access network interface 430, and a storage resource 440. The backbone network interface 420 facilitates communication between processor 410 and backbone network 160 and access network interface 430 facilitates communication between processor 410 and access network 120. Although backbone network interface 420 and access network interface 430 are depicted as separate interfaces, they may be implemented with the same physical interface or interfaces.

The depicted embodiment of storage resource 440 includes instructions 450 and data 460. The instructions 450, as depicted in FIG. 5, may include operating system/firmware 502 and a traffic filter application 510. The data 460 of storage resource 440 may include a data structure referred to herein as traffic policy table 520. The traffic policy table 520 may include information that influences or dictates a traffic policy carried out by edge device 140. In some embodiments, the traffic policy of edge device 140 determines, at least in part, which types of packet traffic initiated by a client 110 will be blocked or otherwise prevented from traversing edge device 140. The traffic policy of edge device 140 may be determined by the traffic policy table 520 in conjunction with the traffic activity state determined or received by edge device 140.

Figures 7, 8:
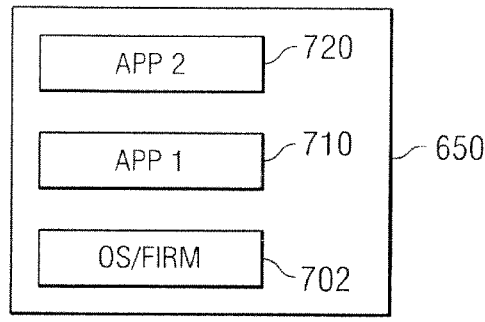
FIG. 7 is a block diagram of selected computer program product elements of an embodiment of the client of FIG. 6.
FIG. 8 depicts selected portions of an exemplary traffic policy table suitable for use in the network of FIG. 1.

Referring to FIG. 8, selected portions of an exemplary embodiment of a traffic policy table 520 are depicted. In the depicted embodiment, traffic policy table 520 includes a plurality of columns and rows. Each row 530 represents a category of packet traffic. In the depicted implementation, for example, the rows 530 represent one or more port numbers. Each packet that is transmitted over backbone network 160 may include a port number associated with the transport protocol employed by backbone network 160. The traffic policy table 520 is operable to indicate traffic policy based at least in part on the transport protocol port number of each packet.

In the depicted embodiment, traffic policy table 520 includes a set of columns 521 through 526. Column 521 identifies the category of the corresponding row 530, column 522 includes a priority indicator and columns 523 through 526 represent four different values or levels of the traffic state parameter. The different levels of a traffic state parameter as depicted in FIG. 5 include a low value, a medium value, a high value, and a very high value.

Thus, in the depicted embodiment, the traffic policy table 520 defines four distinct traffic policies for each row 530. In the depicted implementation where rows 530 correspond to transport protocol port numbers, traffic policy table 520 defines four traffic policies for each port number or set of port numbers represented by a row 530. For any given port number and value of the traffic state parameter, traffic policy table 520 indicates how edge device 140 will handle the traffic bearing the given port number. The traffic policy table 520 as shown implements a binary policy in which edge device 140 is either "open" for a given level of the traffic state parameter and a particular type of packet, reflected by the packet's transport protocol port number, or "closed." If traffic policy table 520 indicates that edge device 140 is closed for a particular type of packet at a particular level of the traffic state parameter, edge device 140 will block or otherwise prevent packets of that type from reaching the backbone network 160.

Thus, the described embodiments of network 100 include functionality to enable edge device 140 to prevent certain types of network traffic from traversing edge device 140 from access network 120 to backbone network 160. The depicted embodiment of traffic policy table 520 prioritizes network traffic based at least in part on a packet's transport protocol port number. This implementation uses the transport protocol port number of a packet as a proxy for the priority or importance of the packet. This embodiment leverages readily accessible information that is available in every network packet, but recognizes a correlation between various types of protocols and technologies and the importance of the traffic that those types of protocols and technologies generate. For purposes of this disclosure, importance refers to the importance of processing the packet in a time of national, regional, or local crisis or emergency.

For example, the depicted embodiment of traffic policy table 520 includes a first category of port numbers from 1-79 and a second category of port numbers including port numbers 80 and 81. For a low value of the traffic state parameter, edge device 140 is open for both types of packet traffic. If, however, the value of the traffic state parameter increases to the very high level, traffic policy table 520 indicates that edge device 140 will be open to packets in the first category but closed to packets in the second category. This policy may reflect a policy decision that traffic that uses TCP ports 1-79 includes applications such as email that are considered critical and are supported at all levels of the traffic state parameter. On the other hand, traffic that uses TCP ports 80 and 81 represents HyperText Transfer Protocol (HTTP) traffic that is characteristic of web surfing. The policy decisions reflected in traffic policy table 520 are merely exemplary and other implementations are readily supported. For example, other examples of traffic policy table 520 may include finer gradations of port number categories for the rows 530. In addition, the policy decisions implemented by a traffic policy table 520 may incorporate information other than the traffic type reflected in the packet's port number.

Figures 9, 10:
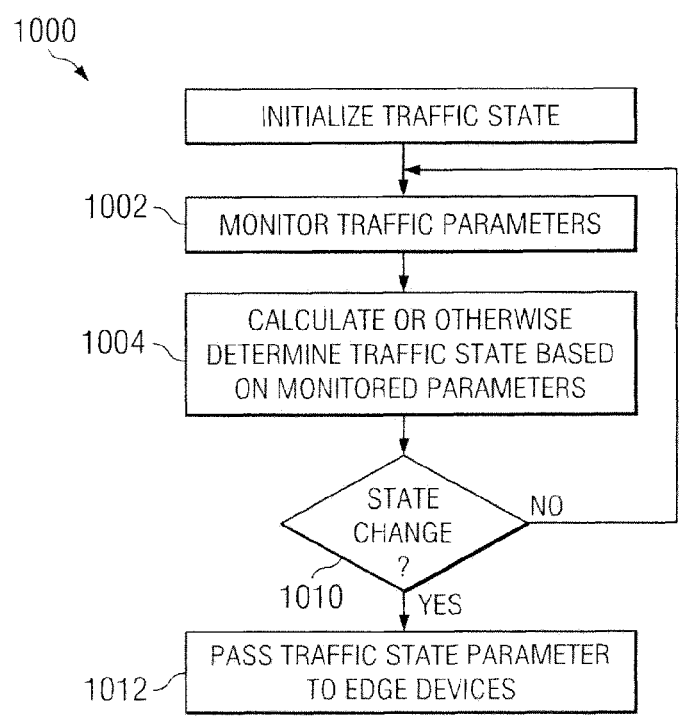
FIG. 9 depicts selected portion of an second exemplary traffic policy table suitable for use in the network of FIG. 1.
FIG. 10 is a flow chart depicting selected elements of an embodiment of an operating method for the provider server of FIG. 2.

Referring to FIG. 9, for example, a second embodiment of a traffic policy table 520 includes a pair of policies for each combination of transport protocol port number and traffic state parameter value. The first policy may represent the policy that is enforced if an environmental parameter, such as the time of day, has a particular value while the second policy represents the traffic policy for other times of day. This enhancement beneficially permits fine tuning of a traffic filtering policy to reflect different realities of network usage that occur, for example, during business hours and during off business hours.

Figure 6:
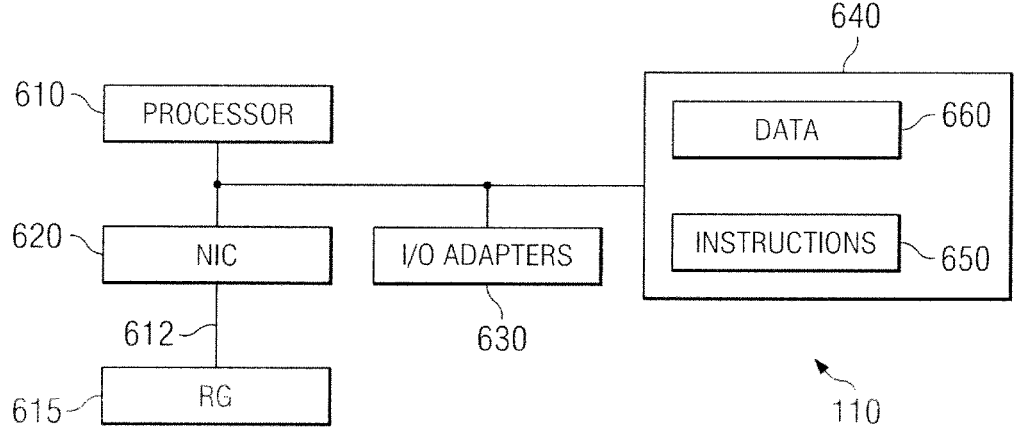
FIG. 6 is a block diagram of selected elements of an embodiment of a client in the network of FIG. 1.

Referring now to FIG. 6 and FIG. 7, selected hardware and software elements of an embodiment of client 110 are depicted. In the depicted embodiment, client 110 is implemented as a general purpose data processing device such as a laptop or desktop personal computer. Client 110 as shown includes a general purpose processor 610 connected to a NIC 620 and a storage resource 640 that includes instructions 650 and data 660. The depicted embodiment of client 110 further includes one or more I/O adapters 630 representing user I/O devices including, for example, a keyboard, a mouse, a microphone, a display device, speakers and so forth. FIG. 6 depicts a residential gateway 610 connected between NIC 620 and access network 120. Residential gateway 610 may provide firewall, routing, and other functionality to the client 110. In configurations that include residential gateway 610, client 110 may connect to residential gateway 610 via a wireless or wireline local area network (LAN) connection 612 may be implemented as a general purpose data processing equipment such as a laptop or desktop personal computer, or as a dedicated multimedia appliance such as a set top box.

As shown in FIG. 7, the instructions 650 in storage resource 640 include a first network-enabled or network-aware application 710 and a second network-enabled or network-aware application 720. First application 710 may represent an application that generates high priority packet traffic and second application 720 may represent an application that generates lower priority packet traffic. For example, first application 710 may represent an email program that transmits and receives email content while second application 720 may represent a Web browser. When first application 710 and second application 720 generate packet traffic that is received by edge device 140, the traffic policy in place may differentiate the manner in which edge device 140 handles or processes the traffic for the two applications. If the traffic state parameter value is sufficiently high, edge device 140 may block the low priority traffic including, in some embodiments, HTTP traffic generated by second application 720 while transmitting high priority traffic including, in some embodiments, traffic generated by first application 710.

Referring now to FIG. 10, a flow diagram depicts selected elements of an embodiment of an operating method employed by provider server 170. In the depicted embodiment, provider server 170 monitors (block 1002) packet traffic on backbone network 160 and calculates (block 1004) or otherwise assigns a value for a traffic state parameter based on the monitored traffic. The assignment of traffic state parameter values to various levels of traffic on backbone network 160 is an implementation detail that may be influenced by a large number of parameters and considerations. Hysteresis may be beneficially included in the determination of a traffic state parameter value to prevent "thrashing" of the traffic state parameter.

Method 1000 as depicted further includes, after calculating a traffic state parameter, determining (block 1010) whether the traffic state parameter has changed from a previous value. If the traffic state parameter value has changed, method 1000 includes provider server 170 sending (block 1012) a traffic state parameter message to one or more edge devices 140. In some embodiments, a multicast group that includes all or substantially all of the edge devices 140 is generated and the provider server 170 may then multicast the traffic state parameter message to all of the edge devices 140 to conserve network bandwidth. In other embodiments, a provider server 170 may send traffic state parameter messages to selected edge devices 140. In some embodiments, for example, it may be desirable to implement different traffic policies for different clients. If selected edge devices 140 were configured to communicate with a subset of clients 110 considered to be high priority clients, e.g., a local, state, or national office of the American Red Cross, the selected traffic policy implemented on the selected edge devices 140 might be different than the traffic policy implemented on other edge devices 140. In other scenarios, the network provider may desire to keep all edge devices 140 accessible to all clients 110 so that any client 110 can access any provider server 170 via any intervening edge device 140 to provide maximum geographical and logical redundancy. In these embodiments, a provider server 170 may impose a universal traffic policy on all edge devices 140 and all clients 110.

Figure 11:
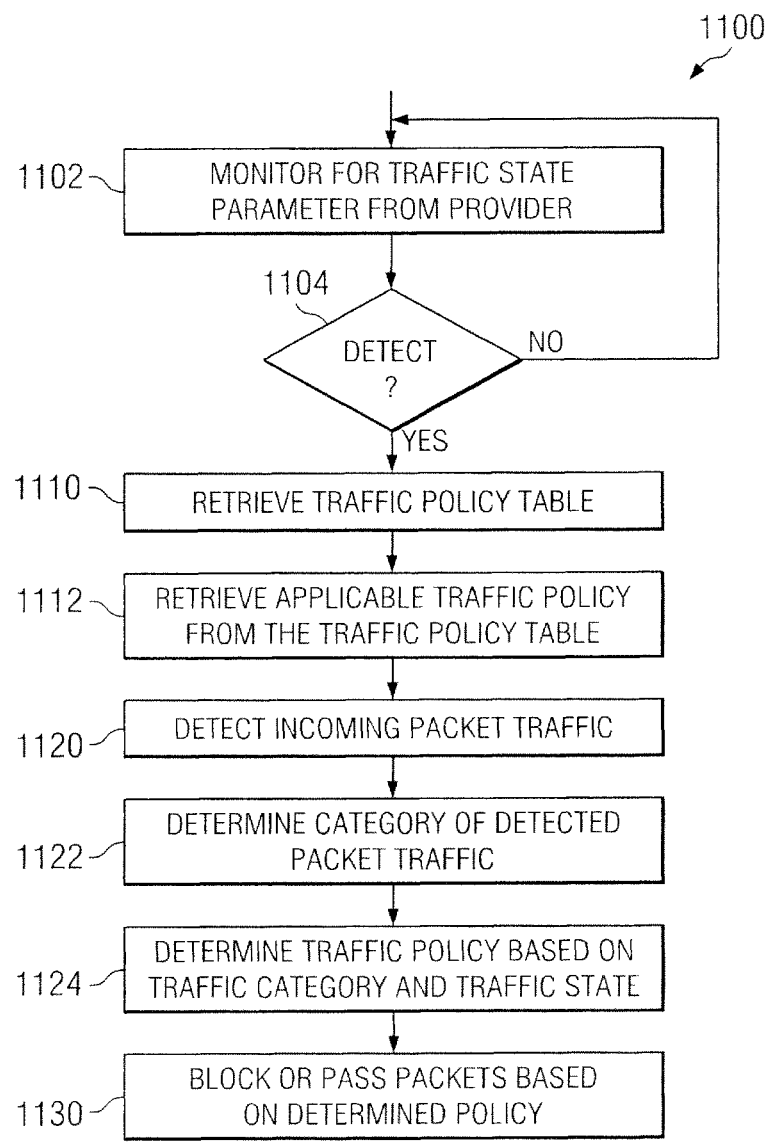
FIG. 11 is a flow chart depicted selected elements of an embodiment of an operating method for the edge device of FIG. 4.

Referring now to FIG. 11, a flow diagram depicts selected elements of an embodiment of an operating method 1100 for edge device 140. The selected elements of method 1100 depicted in FIG. 11 emphasize the traffic policy enforcing functionality of edge device 140. In the depicted embodiment, method 1100 includes edge device 140 monitoring (block 1102) backbone network 160 for a traffic state parameter message from provider server 170. Upon receiving a traffic state parameter message from provider server 170, method 1100 as shown includes retrieving (1110) or otherwise accessing a traffic policy table 520 and retrieving (1112) or otherwise implementing the traffic policy indicated in the column of traffic policy table 520 applicable to the traffic state indicated by the traffic state parameter value contained in the traffic state parameter message received from provider server 170. In some embodiments, edge device 140 may simply use the current value of the traffic state parameter to form a column index into the traffic policy table 520 to determine the applicable policy for a given packet port number.

Method 1100 as shown further includes edge device 140 detecting (block 1120) packet traffic incoming from a client 110. Method 1100 further includes determining (block 1122) a category of packet traffic associated with the incoming packets. In some embodiments, as discussed above, determining the packet category type may include determining the transport protocol port number of the incoming packets. In other embodiments, the determination of an incoming packet's priority or importance may be determined using another proxy for priority. For example, other embodiments may determine from an application layer of incoming packets whether the packets are sufficiently high priority for the current state of traffic on backbone network 160.

Method 1100 as depicted further includes determining (block 1124) a traffic policy applicable to a category type of the incoming packet and to the current state of traffic on the backbone network 160 as indicated by the current value of the traffic state parameter. When the applicable traffic policy is determined, the depicted embodiment of method 1100 includes applying the determined traffic policy to the packet to block the packet from traversing the edge device 140 or to permit the packet to traverse edge device 140.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    determining a category of a network packet received by an edge device from a client;
    determining a value of a traffic parameter, wherein the traffic parameter is indicative of a level of traffic activity in a private network to which the edge device is connected;
    determining a traffic policy applicable for the level of traffic activity and the category of the network packet; and
    determining whether to block the network packet from traversing the edge device based on the traffic policy;
    wherein the value of the traffic parameter applies to all categories of network packets; and
    wherein determining the category comprises determining a transport protocol port number of the network packet.

2. The method of claim 1, wherein determining the traffic policy comprises looking up the traffic policy in a traffic policy table based on the category and the value of the traffic parameter.

3. The method of claim 1, wherein determining the traffic policy comprises selecting the traffic policy based on an environmental factor.

4. The method of claim 3, wherein the environmental factor is determined at least in part by a time of day value.

5. The method of claim 1, wherein determining the value of the traffic parameter includes periodically receiving the value of the traffic parameter from a provider server.

6. A non-transitory computer readable medium storing program instructions, executable by a processor, the program instructions comprising instructions enabling the processor to perform operations to:

determine a category of a network packet received by an edge device from a client;

determine a value of a traffic parameter, wherein the traffic parameter is indicative of a level of traffic activity in a private network to which the edge device is connected and wherein the value of the traffic parameter applies to all categories of network packets;

determine a traffic policy applicable for the level of traffic activity and the category of the network packet; and determine whether to block the network packet from traversing the edge device based on the determined traffic policy;

wherein determining the category comprises determining a transport protocol port number of the network packet.

7. The non-transitory computer readable medium of claim 6, wherein determining the value of the traffic parameter includes periodically receiving a value of the traffic parameter from a provider server.

8. The non-transitory computer readable medium of claim 6, wherein determining the traffic policy comprises looking up the traffic policy in a traffic policy table based on the category and the value of the traffic parameter.

9. The non-transitory computer readable medium of claim 6, wherein determining the traffic policy comprises selecting the determined traffic policy from multiple traffic policies wherein selecting the traffic policy comprises selecting the traffic policy based on an environmental factor.

10. The non-transitory computer readable medium of claim 9, wherein the environmental factor is determined at least in part by a time of day value.

11. An edge device for use in a data processing network, the edge device comprising:

a private interface to communicate with a provider server via a private network;

an access interface to communicate with a client via an access network; and a processor in communication with the private interface and the access interface and configured to access a storage resource containing instructions, executable by the processor, wherein the instructions include instructions enabling the processor to:

determine a category of the network packet;

determine a value of a traffic parameter, wherein the traffic parameter is indicative of a level of traffic activity in a private network to which the edge device is connected and wherein the value of the traffic parameter is the same for all categories of network packets;

determine a traffic policy applicable for the level of traffic activity and the category of the network packet; and determine whether to block the network packet from traversing the edge device based on the determined traffic policy;

wherein determining the category includes determining a transport protocol port number of the network packet.

12. The edge device of claim 11, wherein determining the value of the traffic parameter includes periodically receiving a value of the traffic parameter from a provider server.

13. The edge device of claim 11, wherein determining the traffic policy includes selecting the determined traffic policy from multiple traffic policies wherein selecting the traffic policy includes selecting the traffic policy based on an environmental factor.

14. The edge device of claim 13, wherein the environmental factor is determined at least in part by a time of day value.

15. The edge device of claim 11, wherein the value of the traffic parameter is selected from a finite set of defined traffic states.

16. The edge device of claim 15, wherein the finite set of defined traffic states include a low traffic state, a medium traffic state, and a high traffic state.

* * * * *